United States Patent [19]
Maxwell, Jr.

[11] Patent Number: 5,152,584
[45] Date of Patent: Oct. 6, 1992

[54] DECORATIVE CENTER CAP AND KNOCK-OFF HUB FOR TRUCKS

[76] Inventor: Lewis Maxwell, Jr., 16132 Hartwell, Detroit, Mich. 48035

[21] Appl. No.: 650,304

[22] Filed: Feb. 4, 1991

[51] Int. Cl.$^5$ ............................................... B60B 7/06
[52] U.S. Cl. ........................... 301/37 S; 301/37 CM; 301/108 S
[58] Field of Search .............. 301/37 R, 37 CM, 37 S, 301/37 SC, 108 R, 108 S, 108 SC

[56] References Cited

U.S. PATENT DOCUMENTS

| | | | |
|---|---|---|---|
| 1,887,611 | 11/1932 | Wittenberg | 301/37 R |
| 2,151,485 | 3/1939 | Pawsat | 301/108 SC X |

FOREIGN PATENT DOCUMENTS

| | | | |
|---|---|---|---|
| 544441 | 8/1957 | Canada | 301/37 SC |
| 3611038 | 4/1987 | Fed. Rep. of Germany | 301/37 SC |
| 844537 | 10/1938 | France | 301/108 R |
| 921082 | 4/1947 | France | 301/108 R |
| 466148 | 10/1951 | Italy | 301/37 SC |

*Primary Examiner*—Russell D. Stormer
*Attorney, Agent, or Firm*—Gifford, Groh, Sprinkle, Patmore and Anderson

[57] ABSTRACT

A decorative center cap and knock-off hub for trucks provides a decoratively shaped and designed truck wheel. The wheel is of a diameter equivalent to that of a conventional truck tire rim. The wheel abuts a center cap portion. The cap possesses a plurality of circumferentially spaced apertures which are mounted upon a like plurality of circumferentially spaced bolts protruding from the wheel. A further like plurality of nuts threadably engage the bolts to mount the cap onto the truck wheel. The wheel provides an appealing and decorative shape. A knock-off hub further threadably engages a neck portion extending from the cap. The hub attachment may further be decoratively shaped.

11 Claims, 1 Drawing Sheet

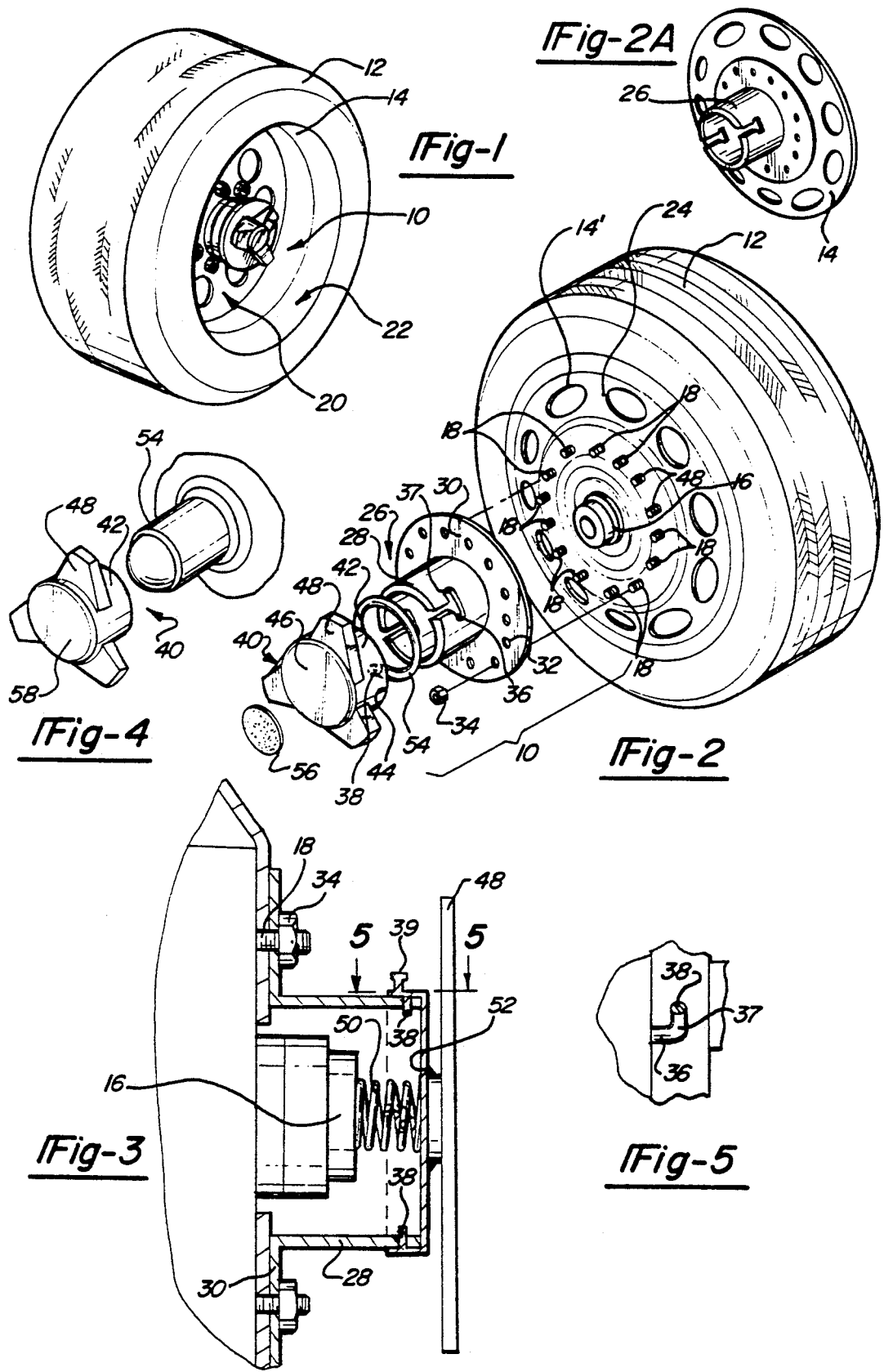

DECORATIVE CENTER CAP AND KNOCK-OFF HUB FOR TRUCKS

BACKGROUND OF THE INVENTION

I. Field of the Invention

The present invention relates to a center cap and knock off hub for trucks.

II. Description of the Prior Art

Various types of wheel covers are known in the art. Of these known wheel covers, the majority are designed for use on passenger automobiles and the like. There has long been a desire to enhance and improve the ornamental appearance of trucks and other large vehicles. Passenger automobile wheel covers are not suitable for use on most trucks due to differences in size. The existing covers for trucks also show a lack of decorative appearance. Prior art wheel covers include simulating a wire wheel with a knock-off for trucks, trailers and the like.

U.S. Pat. No. 4,217,002 issued to Simpson discloses a simulated wire wheel cover adapted to be mounted on the wheels of trucks, trailers, and the like. The wire covered disk of Simpson is adapted to be mounted onto a casing by means by mounting bores positioned at its outermost ends. An inner mounting flange separately attaches to the truck wheel in Simpson.

Other types of wheel covers for trucks are disclosed in U.S. Pat. No. 4,761,040 issued to Johnson, and U.S. Pat. No. 4,787,681 issued to Wang et al. Johnson discloses a hub extension for mounting a wheel cover. The wheel cover of Johnson mounts onto a plate member which is in turn mounted to an axial end portion by means of axially directed bolt and rod assemblies. Wang et al discloses a simulated custom wheel cover attachable to an automotive wheel by means of a number of lug nuts and decorative lug nut covers.

Finally, U.S. Pat. No. 4,462,639 issued to Holmstrom discloses a wheel cover support pedestal having a cylindrical portion threaded to accept the wheel cover nut for mounting a wheel cover to the hub of a wheel. The wheel cover of Holmstrom provides a threaded cavity for threadably engaging an extended element of the wheel pedestal.

Therefore, it is a primary objective of the present invention to provide an ornamental truck center cap and knock-off hub which forms an integral part of the rim of a truck wheel. It is a further objective of the present invention to provide a wheel and cap which displays attractive and ornamental features. It is an additional objective of the present invention to provide a knock-off hub that is engageable with the cap and which also displays attractive and ornamental design patterns.

SUMMARY OF THE PRESENT INVENTION

The present invention provides a decorative center cap and knock-off hub for trucks which addresses the lacking in the teachings of the prior art.

In brief, the center cap and knock-off hub of the present invention provides a center cap for mounting to a conventional truck wheel and a knock-off hub. The wheel is of a slightly convex shape, or is flat and inwardly recessed, and contacts a center cap. The cap possesses a plurality of circumferentially spaced apertures in a precise circumferential alignment for accepting a like plurality of circumferentially spaced bolts of the which a number of nuts frictionally engage the spaced bolts so as to firmly mount the cap to the wheel.

The knock-off hub is provided with wings or other patterned shapes located on its exterior face. The inner face of the hub includes a hollow circular end which is removably mounted to a neck portion extending from the cap.

BRIEF DESCRIPTION OF THE DRAWINGS

A better understanding of the present invention will be had upon reference to the following detailed description, when read in conjunction with the accompanying drawing, wherein like reference characters refer to like parts throughout the several views, and in which:

FIG. 1 is a perspective view of a preferred embodiment of the present invention;

FIG. 2 is an exploded view of the center cap and knock-off hub assembly of the present invention;

FIG. 2a is a perspective view of an alternative embodiment of the invention;

FIG. 3 is a cut away side view illustrating the connection of the center cap and knock-off hub of the present invention;

FIG. 4 is a sectional view of the flange and wheel cover of the present invention molded as one piece; and FIG. 5 is a partial sectional view of a stud and slot attaching the knock-off hub to the center cap of the present invention.

DETAILED DESCRIPTION OF THE PREFERRED EMBODIMENT OF THE PRESENT INVENTION

Referring to FIGS. 1 and 2, the preferred embodiment of the center cap and knock-off hub 10 for trucks of the present invention is thereshown and comprises a tire 12 which is mounted upon a wheel 14. A central rotary axle 16 of the motor vehicle (not shown) protrudes from the wheel 14.

A plurality of bolts 18 are shown and are circumferentially spaced and protrude outwardly from the wheel 14. In one embodiment, the wheel 14 (FIG. 1) provides a flat recessed surface 20 and inner side wall 22. In an alternative embodiment, as shown in FIG. 2a, the wheel 14' has a disk shaped portion 24 having a slightly outward convex shape.

A center cap 26 is shown in FIGS. 2 and 3. The center cap has a cylindrical neck 28 having a flange 30 extending radially from one end of the neck 28. The flange 30 has a plurality of circumferentially spaced apertures 32 which are positioned to accept respective bolts 18 extending from either wheel 14 or wheel 14'. The central cap 26 is held in place by nuts 34 threadably engageable with the bolts 18.

As shown in FIG. 3, the neck 28 is of a hollow cylindrical shape having an opening 32 at an end opposite the flange 30. A pair of slots 36 extend axially through the neck 28 from the opening to a circumferential recess 37 for receiving a pair of studs 38 of a knock-off hub 40 for mounting the hub, as discussed more fully below. The central cap 26 may be formed of any suitable rigid material such as stainless steel, chrome plated steel, or composite material. A securing bolt 39 is further provided and screws into an aperture in the hub 40. The securing bolt 39 contacts the neck 28 and prevents disengagement of the hub 40 from the neck 28.

The knock-off hub 40 is formed to take the appearance of knock-off hubs found on sports cars. The hub has a barrel 42 having an open end 44 and an opposite closed end 46. Three wings 48 extend radially from the barrel 42. The open end of the barrel is formed to accept the neck 28 of the cap 26. The pair of studs extend radially into an interior cavity in the barrel and are positioned to be received in the slots 36 and recesses 37 of the cap. A spring 50 as shown in FIG. 3 is secured to an inner surface 52 of the closed end 46 so that the spring extends through the opening 36 of the cap to engage the axle 16. The hub 40 is biased in position on the cap 26 by the force of spring 50 as it is transferred to the cap 26 by the studs 38 engaging the recess 37.

Alternatively, the cap 26 may be biased by a resilient O-ring 54 which is positioned with the barrel cavity to engage the end of the cap 26. As shown in FIG. 4, the O-ring 54 provides a biasing force in the same manner as the spring 50. The cap 26 and wheel 14 may further be cast as a one-piece construction.

As shown in FIG. 2, the hub 40 may further be provided with a reflector 56 mounted upon the hub 40 to prevent accidental collisions with the hub 40 during evenings or at night. Likewise, the hub may be provided with a small battery powered light mounted within the barrel and having a lens 58 positioned on the end surface of the hub as shown in FIG. 4.

The knock-off hub 40 may additionally provide a variety of wings 48 positioned in any aesthetically pleasing manner on the hub 40. Referring to FIGS. 2 and 3, it is apparent that any of a number of spare decoratively shaped hubs 40 may be rotatingly interchangeable with the relatively fixed neck 28 and cap 26 of the present invention. The fact that the hub 40 mounts directly onto the wheel 14 by means of the cap 26 permits ease of application and interchangeability.

Having described my invention, many modifications thereto will become apparent to those skilled in the art to which it pertains without deviation from the spirit of the invention as defined by the scope of the appended claims. For instance, the flange 30 may, alternatively, be molded as one piece with the wheel 14 and 14'.

I claim:

1. A decorative device for a wheel having an axle supporting a tire of a truck, said device comprising:
   a knock-off hub;
   a center cap mounted to said wheel, said center cap having a cylindrical neck and a flange extending radially from one end of said cylindrical neck, said flange having an exterior surface with a plurality of circumferentially spaced apertures being formed therethrough, said plurality of apertures being engaged by a like plurality of circumferentially spaced bolts which protrude from said wheel; and
   means for attaching said knock-off hub to said cap so that said plurality of bolts which engage said plurality of apertures are exposed to view, said means for attaching having a biasing member mounted to said knock-off hub, said biasing member extending inwardly to contact said axle whereby said knock-off hub is held in position on said center cap.

2. The invention as described in claim 1, further comprising a plurality of threaded nuts for securing said cap onto said wheel, said nuts threadably engaging said protruding bolts.

3. The invention as described in claim 1, said cap and said wheel being cast as a one-piece construction.

4. The invention as described in claim 3, said wheel further possessing a decorative pattern placed thereon.

5. The invention as described in claim 1, said neck further comprises a plurality of female locking members formed therein.

6. The invention as described in claim 5, said knock-off hub further comprising a hollow circular end, said end having additional male locking members projecting therefrom, said matching male and female locking members causing said hub to rotatingly engage said neck.

7. The invention as described in claim 6, wherein said hub is shaped with radial outwardly flaring wings.

8. The invention as described in claim 7, wherein said hub is shaped in various decorative styles.

9. The invention as described in claim 6, further comprising a securing bolt for preventing rotational disengagement of said hub from said neck, said bolt contacting said neck through an aperture formed in said overlying circular end of said hub.

10. The invention as described in claim 1, said knock-off hub further comprising reflectors mounted to the exterior face of said hub.

11. A decorative device for a wheel supporting a tire of a truck, said device comprising:
    a knock-off hub;
    a plurality of circumferentially-spaced bolts protruding outwardly from said wheel;
    a central cap attachable to said wheel, said cap providing a having a flange having plurality of circumferentially-spaced apertures formed therethrough, said apertures overlying and received by said bolts protruding from said wheel;
    a plurality of nuts fastenable to said bolts to mount said cap onto said wheel;
    a cylindrical neck extending from said flange of said cap, said neck having male locking members projecting therefrom;
    said knock-off hub rotatingly attachable to said neck, said hub having additional female locking members placed within a circular end and matching said male locking members of said neck so as to cause rotational engagement with said neck, and
    a securing bolt engagable with said neck when said hub is mounted thereon, said securing bolt contacting said neck through an aperture in said circular end of said hub, said bolt preventing rotational disengagement of said hub when mounted upon said neck.

* * * * *

UNITED STATES PATENT AND TRADEMARK OFFICE
CERTIFICATE OF CORRECTION

PATENT NO. : 5,152,584
DATED : October 6, 1992
INVENTOR(S) : Lewis Maxwell, Jr.

It is certified that error appears in the above-identified patent and that said Letters Patent is hereby corrected as shown below:

Claim 11, Column 4, Line 37, after "providing", please delete "a having"; after "flange having", insert --a--.

Signed and Sealed this

Twenty-sixth Day of October, 1993

Attest:

BRUCE LEHMAN

Attesting Officer     Commissioner of Patents and Trademarks